Nov. 20, 1923.

J. HARRIS 1,474,965

ELECTRICITY METERING SYSTEM

Filed Jan. 26, 1920

Inventor:
Jesse Harris
By G. L. Cragg Atty.

Patented Nov. 20, 1923.

1,474,965

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

ELECTRICITY-METERING SYSTEM.

Application filed January 26, 1920. Serial No. 354,277.

*To all whom it may concern:*

Be it known that I, JESSE HARRIS, a citizen of the United States, residing at La Fayette, in the county of Tippecanoe and State of Indiana, have invented a certain new and useful Improvement in Electricity-Metering Systems, of which the following is a full, clear, concise, and exact description.

My invention resides in an integrating motor watt meter designed to measure energy furnished a working circuit only when the load is above a predetermined value, the energy in the circuit when the load is below such predetermined value being charged for on a flat rate basis or being measured by an ordinary integrating watt meter.

In carrying out my invention I employ electro-magnetic means, subject to the pressure of the system and co-operating with the pressure winding and meter armature to furnish substantially constant torque operating upon the shaft of the meter in opposition to the forward torque to prevent the counting operation of the meter when the load is below a predetermined value and permitting the counting operation of the meter when the load exceeds said predetermined value, and means for preventing reverse operation of the counting mechanism. The means which I prefer to employ for preventing reverse operation of the counting mechanism is preferably a detent engaging a motor driven element and co-operating therewith to prevent reverse operation of the meter itself.

Figure 1:
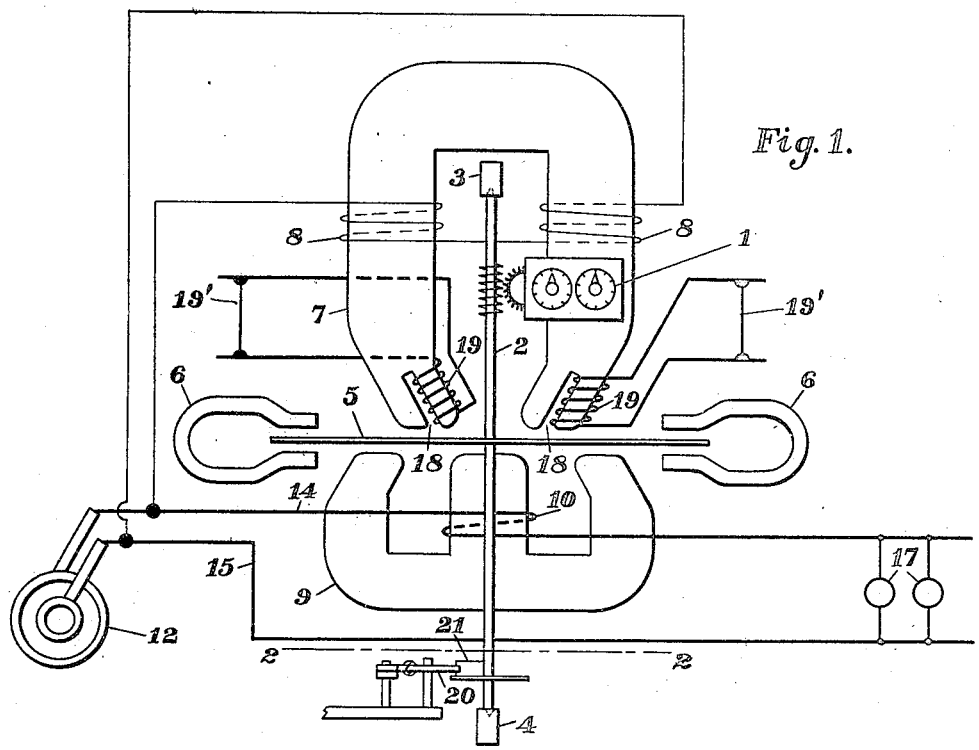
Figure 2:
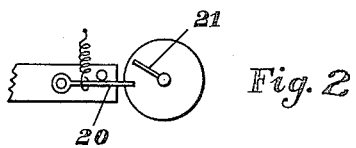

I will explain my invention more fully in connection with the accompanying drawing in which Fig. 1 diagrammatically illustrates a system of alternating electric current distribution employing a preferred form of induction integrating watt meter, though it is to be understood that my invention is not to be limited to the employment of induction meters nor to systems of alternating electric current distribution; and Fig. 2 is a sectional view on line 2—2 of Fig. 1, showing the preferred means for preventing reverse operation of a meter.

Like parts are indicated by similar characters of reference in both figures.

Reference will first be had more particularly to the arrangement illustrated in Fig. 1.

The meter illustrated includes any suitable integrating or revolution counting mechanism 1 which is operated by the upright motor shaft or spindle 2 suitably supported at its ends in bearings 3, 4. Said spindle carries a closed conductor in the form of a disc 5, preferably made of aluminum. This disc may serve as an armature to constitute a part of the motive element of the meter and also preferably serves as an element of a damping device which turns in a constant magnetic field furnished by one or more damping permanent magnets 6, in accordance with common practice. The armature 5 is subject to potential magnetic flux passing therethrough from the poles of the U-shaped magnet core 7 that is perpendicular to and on one side of the armature disc 5 and is provided with the shunt winding 8. An E-shaped core 9 is perpendicular to and upon the other side of the armature disc. The middle leg of core 9 is wound with a current winding or coil 10 included in a main of the system. The pressure winding 8 is connected in parallel with the source 12. The mains 14, 15 extend from the source of current and constitute sides of a working or load circuit. Translating devices 17, such as incandescent lamps, are connected in bridge between the mains.

The polar portions of the shunt core 7 are provided with recesses 18 to form minor U-shaped cores of or upon said polar portions. A closed coil or conductor 19 is placed upon one limb of each minor U-shaped core. Each closed conductor co-operates with the aforesaid pressure winding and the meter armature to furnish substantially constant torque operating upon the meter armature in opposition to the forward torque to prevent the counting operation of the meter when the load is below a predetermined value and permitting the counting operation of the meter when the load exceeds said predetermined value. The torques furnished with the aid of the closed conductors 19 act in the same direction, and I do not, therefore, wish to be limited to the two conductors 19.

Any suitable means may be employed for adjusting the torques produced by the closed conductors 19, such for example as the resistance wires 19′ selected and connected to accomplish this purpose.

The means which I prefer to employ for preventing reverse operation of the counting mechanism when the load is below the predetermined value, resides in a detent 20 engaging a motor driven element 21 and co-operating therewith to prevent reverse operation of the meter. This element 21 is preferably a vane upon the meter spindle 2 that is in escaping engagement with the detent upon each forward revolution of said spindle but which has holding engagement with the detent upon tendency of the spindle to reverse rotation.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

The combination with a source of alternating current; of a load circuit supplied thereby; an integrating watt meter including an electric motor element having a closed conductor armature and current and pressure windings in inductive relation to the armature and respectively subject to the current and pressure of the system to furnish torque upon the meter in a forward or counting direction, the pressure winding having a magnet core presenting a polar portion to the meter armature; a closed conductor upon said polar portion co-operating with the aforesaid pressure winding and the meter armature to furnish substantially constant torque operating upon the meter armature in opposition to the forward torque to prevent the counting operation of the meter when the load is below a predetermined value and permitting the counting operation of the meter when the load exceeds said predetermined value; and means for preventing reverse operation of the counting mechanism.

In witness whereof, I hereunto subscribe my name this 19th day of January A. D., 1920.

JESSE HARRIS.